United States Patent [19]

Toda et al.

[11] 4,164,756
[45] Aug. 14, 1979

[54] DISC RECORD GROOVE SKIPPER

[75] Inventors: Minoru Toda; Susumu Osaka, both of Machida; Yasushi Matsumoto, Narashino, all of Japan

[73] Assignee: RCA Corporation, New York, N.Y.

[21] Appl. No.: 895,973

[22] Filed: Apr. 13, 1978

[30] Foreign Application Priority Data

Apr. 19, 1977 [GB] United Kingdom ............... 16280/77

[51] Int. Cl.² .......................... H04N 5/76; G11B 3/38; G11B 17/00
[52] U.S. Cl. ............................ 358/128; 179/100.41 P; 179/100.4 D; 274/23 A; 360/10
[58] Field of Search .................... 358/128; 360/10, 11, 360/36, 77; 274/23 R, 23 A; 179/100.41 K, 100.41 P, 100.4 ST, 100.4 D, 100.3 V

[56] References Cited

U.S. PATENT DOCUMENTS

| 3,961,131 | 6/1976 | Taylor | 358/128 |
| 3,963,861 | 6/1976 | Crooks | 358/128 |
| 3,993,863 | 11/1976 | Leedom et al. | 179/100.41 P |
| 4,049,280 | 9/1977 | Leedom | 358/128 X |

Primary Examiner—Bernard Konick
Assistant Examiner—Donald McElheny, Jr.
Attorney, Agent, or Firm—Eugene M. Whitacre; Joseph S. Tripoli; Dilip A. Kulkarni

[57] ABSTRACT

A signal pickup stylus which cooperates with an information storing spiral groove on a video disc record is caused to selectively skip groove convolutions of the disc record to produce special effects including stop, fast-forward and reverse motion of the displayed image. The stylus is coupled to a support arm. Apparatus is provided for establishing relative motion between the stylus and the support arm. This apparatus is made responsive to deviations in the relative position of the stylus and the support arm from a predetermined relationship.

11 Claims, 11 Drawing Figures

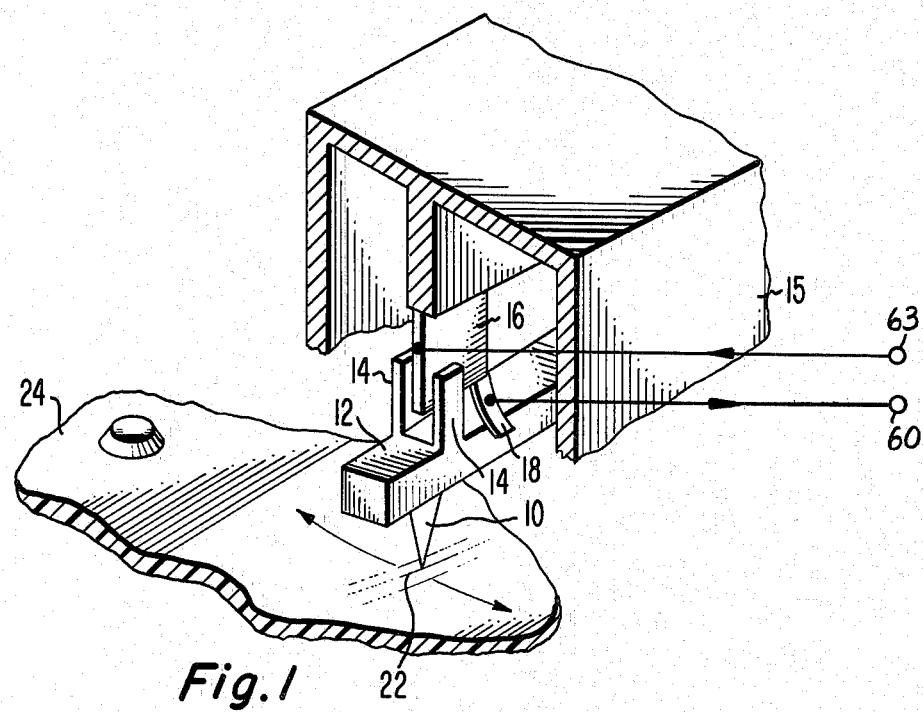
Fig. 1
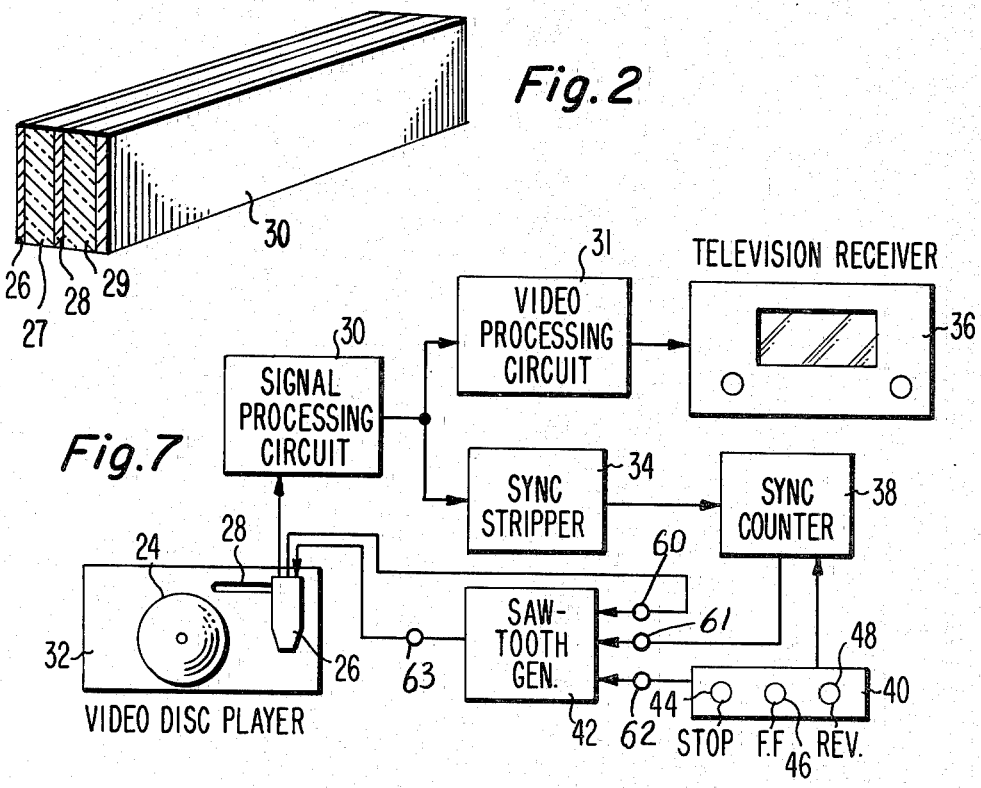
Fig. 2
Fig. 7

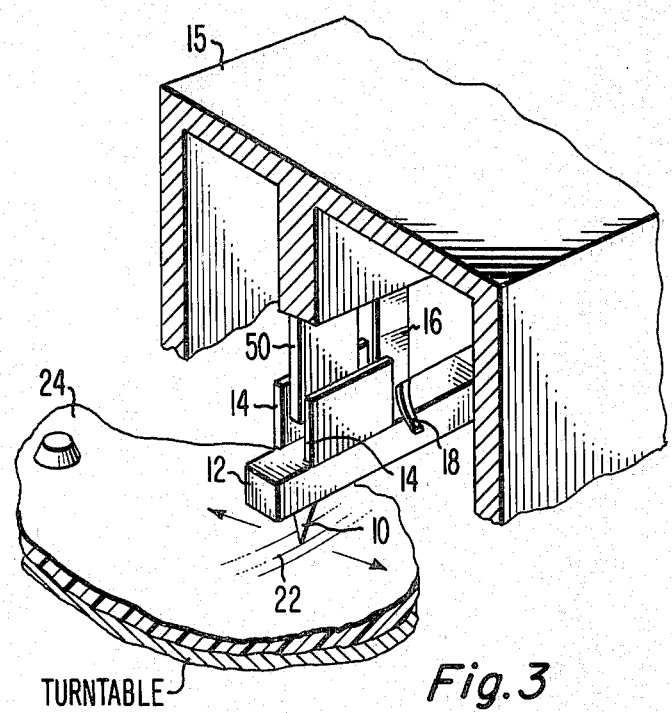
Fig.3 TURNTABLE
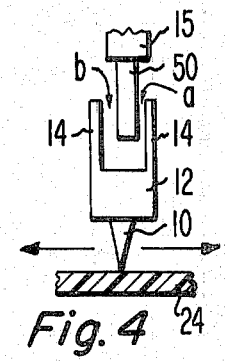
Fig.4
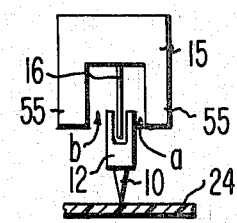
Fig.6
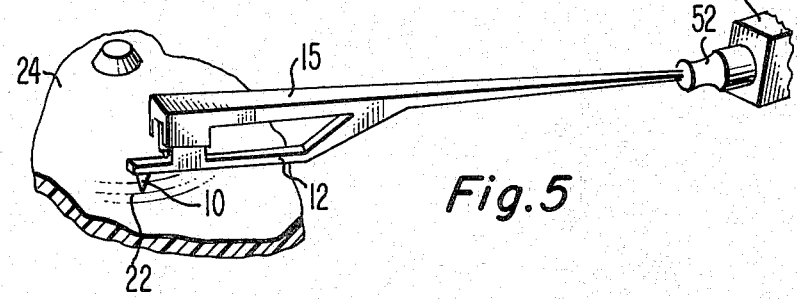
Fig.5
Fig. 8a. ← 1 REVOLUTION →
Fig.8b
Fig.8c
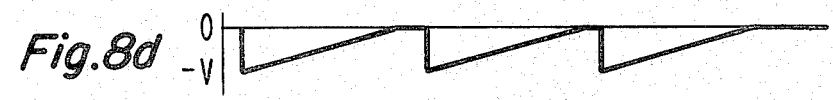
Fig.8d

DISC RECORD GROOVE SKIPPER

This application is concerned with apparatus utilized in the playback of a video disc record and more particularly to apparatus for repositioning a signal pickup stylus from one convolution to another of a signal encoded spiral groove on the disc record.

In one configuration of a video disc player system, signal information is topographically formed in a spiral groove of a disc substrate. The spiral groove and topographic information is thereafter coated with a thin layer of metal and an insulating layer of, for example, styrene, formed over the metallic coating. The recorded disc may then be rotated on the turntable of a playback mechanism and a signal pickup stylus caused to ride in the spiral groove. An electrode portion of the pickup stylus cooperates with the styrene dielectric coating on the record and the metal layer thereunder to form a capacitor. Capacitance variations representative of the topographic pattern in the playback disc are detected by associated electronic circuitry and the signal recorded on the disc thereby decoded. A video disc playback system of this type is described in U.S. Pat. No. 3,842,194, entitled, INFORMATION RECORDS AND RECORDING/PLAYBACK SYSTEMS THEREFOR, by Jon K. Clemens.

Video disc player systems of the type described above generally utilize playback discs having groove densities in the order of four to eight thousand groove convolutions per inch. A typical video disc of this type may therefore have a groove spacing in the order of about 3.5 microns. This relatively narrow groove spacing requires a tracking signal pickup stylus which is capable of following these relatively narrow grooves. Further, it is desirable to provide a pickup stylus and an associated support arm that will follow the narrow spiral groove even when the groove is eccentric with respect to the center hole in the disc, i.e., when the center hole of the disc is not precisely centered on the record. The signal tracking stylus and associated support arm is therefore desirably constructed with a relatively low mass in order to follow any lateral shift in position of the spiral groove.

In certain particular applications of a video disc system, it may be desirable to provide certain features such as stop motion of the displayed image. That is, to repetitively provide output signals of basically the same displayed image on an associated television monitor. A further desirable feature for incorporation with a video disc player is the ability to provide rapid forward motion or reverse motion of the displayed image. Additionally, it will be appreciated that disc records having high groove densities may be subject to an occasional blow causing the spiral groove to prematurely terminate. Such premature termination, referred to as a "locked groove," may result in an undesired repetition of a groove convolution during record playback. It is therefore desirable to incorporate in a video disc player apparatus suitable for repositioning the signal pickup stylus out of a locked groove.

In the prior art (e.g., U.S. Pat. No. 3,993,863—M. A. Leedom, et al.), apparatus for repositioning a signal pickup stylus from one convolution on a spiral grooved disc record to another convolution have been disclosed to comprise means coupled to the stylus for supporting the stylus in relationship with the spiral groove. Positioning means are interposed between the stylus and the support means for responsively providing lateral motion to the stylus with respect to the support means. Control means are coupled to the positioning means and provide signals to control the amplitude and direction of lateral movement of the positioning means.

In accordance with the principles of the present invention, stylus repositioning means are advantageously made responsive to deviations of the relative position of the stylus and its support means from a predetermined relationship. This has the effect of enhancing the accuracy with which the amplitude of the lateral motion is controlled, since it will be appreciated that the stylus, when riding in a groove, is subjected to unpredictable relative motion with respect to the support means.

In accordance with further principles of the present invention, motion limiting means are incorporated in the stylus repositioning apparatus. The limiting means establishes positive limits for the amplitude of lateral motion to enhance control thereover. Advantageously, this limiting means is rendered responsive to the relative position of the stylus and the support means whereby its accuracy is not compromised by deviations in the relative position.

In the accompanying drawings:

FIG. 1 is a perspective view of a stylus and support member embodying the invention;

FIG. 2 is a perspective drawing of a bimorph piezoelectric element utilized with the apparatus of FIG. 1;

FIGS. 3 and 5 are perspective views of stylus and support members in accordance with further embodiments of the invention;

FIGS. 4 and 6 are respective front views of the apparatus of FIGS. 3 and 5;

FIG. 7 is a block diagram of a video disc player and circuitry utilized to operate the apparatus of FIG. 1; and FIGS. 8a–8d illustrate the timing and sawtooth shaped signals utilized to control the apparatus of FIG. 1.

In FIG. 1, a stylus 10 is fastened to a mounting structure 12. Stylus 10 comprises a metal electrode fastened to an insulating material such as diamond. The mounting structure 12 comprises a plastic rectangular structure having an end portion with a notch cut therein suitable for receiving stylus 10. Spaced apart abutments 14 extend upward from mounting structure 12 to define a fork. Mounting structure 12 forms part of a stylus arm support 15 to which it is mechanically coupled in a manner permitting some relative motion therebetween. A piezoelectric, bimorph element 16 (driver bimorph) is fastened to the stylus arm support in a manner permitting it to be freely interposed between abutments 14. Wires are fastened to metal layers on each side of bimorph element 16 for providing electrical connections to this element.

An additional piezoelectric bimorph element 18 (sensing bimorph) is affixed at one end to driver bimorph 16 in a manner allowing its other end to rest on mounting structure 12. The sensing bimorph 18 comprises a thin film and its detected output signal, representative of the instantaneous lateral deviations of the stylus 10 relative to the stylus arm support 15, utilized in such a way that the bending of the sensing bimorph 18 is minimized. In the system of the present invention, the stylus 10 usually follows the shift of the groove 22 formed in a record disc 24, and the driving bimorph 16 exactly follows the stylus motion by virtue of the above mentioned arrangement employing the sensing bimorph 16. Thus the driving bimorph 18, which comprises a relatively thick film, does not limit the motion of the stylus 10 during normal operation while keeping its position relative thereto constant. When the stylus 10 has to be driven suddenly to another groove convolution, a command signal (e.g., a sawtooth signal) with appropriate polarity is applied to the driving bimorph 16 such that it hits the respective one of the abutments 14 and laterally moves the stylus mount 12. Since the driving 16 bimorph produces a large force and the relative position of the stylus 10 with respect to the arm support 15 is constant, the distance by which stylus 10 is displaced is determined only by the control signal. The circuitry utilized to operate the foregoing apparatus of FIG. 1 is subsequently described in conjunction with FIG. 7.

Bimorph element 16, as shown in FIG. 2 is illustratively, comprised of an alternating series of layers of metal and piezoelectric material such as polyvinylidene fluoride. A first metal layer 26 is followed by a piezoelectric element layer 27, followed by a second metal layer 28, a second piezoelectric element 29 and a final layer of metal 30. By arranging the piezoelectric material 27 and 29 in the configuration shown in FIG. 2, a bimorph structure may be realized. A bimorph or bending mode structure is made from the apparatus illustrated in FIG. 2 by properly polarizing piezoelectric elements 27 and 29. Elements 27 and 29 are polarized by first applying an electrical potential of the same polarity to metal layers 26 and 30 with a common electrical return connection to metal layer 28. The piezoelectric and metal structure is thereafter placed in an environment of elevated temperature. The particular temperature required to make the structure bimorph is the Curie Temperature of the piezoelectric material. When the piezoelectric structure is properly cooled, the piezoelectric elements become polarized and the potentials applied to the metal layers 26, 28 and 30 are removed. The resultant polarization is such that element 27 is the opposite polarity from that of element 29 with respect to the outer metal layers 26 and 30. Thereafter, by applying an appropriate potential across metal layers 26 and 30, one of the piezoelectric elements will contract and the other expand causing the entire bimorph structure to bend, when one end of the structure is secured, in a direction dictated by the polarity of the applied potential. By applying a particular potential of given polarity across metal layers 26 and 30, a bending motion of the bimorph element 16 is implemented. Sensing bimorph 18 is formed of a piezoelectric material which provides an electrical output signal in response to bending forces applied thereto. Such materials are well known in the art and a detailed description thereof will not be made here.

In order to effectively control the bending motion of bimorph element 16, the apparatus illustrated in FIG. 7 is utilized. FIG. 7 illustrates a video disc player 32 upon which a pre-recorded video disc 24 is rotated on an associated turntable. An arm housing 26 encloses the apparatus illustrated in FIG. 1 and is arranged to be positioned over video disc 24 by sliding along slot 28. A detailed description of an arm housing is given in U.S. Pat. No. 3,882,267, in the name of Marvin Pat. Leedom entitled, VIDEO PLAYBACK SYSTEM TRACKING ARM AND PICKUP ASSEMBLY. Capacitance variations measured between the disc 24 and the stylus 10 are coupled to signal processing circuit 30 wherein decoding occurs and a video signal produced. Signals provided by signal processing circuit 30 are coupled to a video processing circuit 31 and a sync stripper 34. Video processing circuit 31 rearranges the luminance and chrominance constituents of the video signal into a format suitable for decoding by television receiver 36. A video processing circuit is described in U.S. Pat. No. 3,872,497, entitled, BURIED CARRIER DECODING SYSTEM, in the name of John G. Amery et al. Sync signals provided by sync stripper 34 are coupled to a sync counter 38. Sync counter 38 in response to signals from a control unit 40 provides an output signal which repetitiously occurs at a predetermined whole number division of the frequency of the applied vertical sync signals. A sawtooth generator 42 receives signals from both sync counter 38 (timing information), control circuit 40 (polarity information) and sensing bimorph 18 (stylus lateral deviation information), and responsively provides sawtooth output signals. These sawtooth output signals are coupled to bimorph element 16 and operate to control the bending motion of this element.

In the operation of the above-described circuitry, a displayed image may be caused to effectively stop, move rapidly forward or move in a reverse action. To provide stop motion playing from a video disc record, it is necessary to repetitively play the information played for a previous television frame. A simulated stop motion can also be had by replaying several frames repeatedly. In one particular type of video disc recording, four television frames are recorded in each convolution of a video disc record. To provide an effective stop motion of the image reproduced with this type of video disc recording, the stylus 10 may be repeatedly repositioned in an adjacent outer convolution of the disc after each disc revolution. In other words, four frames of video information may be continuously repeated by causing the stylus 10 to skip to an adjacent outer convolution at the same position on the record during each revolution.

Fast-forward play of the video disc record may be implemented by causing the stylus 10 to skip to an adjacent inner convolution (towards the center of the record) at particular portions of the convolution in which it is riding. For example, the stylus may be made to skip to an adjacent inner groove convolution at each half revolution of the video disc record. The resultant image produced by playing ones and skipping others of the recorded frames appears in a speed-up sequence.

Similarly, reverse motion of the displayed image can be effected by causing the pickup stylus 10 to shift groove convolutions towards the outside of the record disc after, for example, each half revolution of disc rotation. This, in effect, causes the pickup stylus and arm to slowly move towards the outside of the disc. In other words, the video disc player 32 is caused to play two frames in the forward direction and then caused to skip back four frames and play two more in the forward direction and so on progressing towards the beginning of the record disc.

To effect stop motion of the displayed image, the stop button 44 of control panel 40 is depressed. Stop button 44 engages a divide by eight portion of sync counter 38 and further sets the polarity of the output signal provided by sawtooth generator 42. Sync counter 38 receives vertical sync pulses from sync stripper 34 during the vertical blanking interval of each television field. There are eight television fields per revolution of the video disc corresponding to four television frames. Vertical timing pulses corresponding to vertical sync signals are illustrated in FIG. 8a. When eight vertical sync signals have passed into sync counter 38, an output signal is developed and applied to sawtooth generator 42.

Sawtooth generator 42 generates a sawtooth waveform having a sharp rise time corresponding to the initiation of the input signal provided by counter 38 (see FIG. 8b). The sharp rise in voltage causes the bimorph element 16 in pickup arm 15 to rapidly bend, moving stylus 10 to an adjacent groove convolution towards the outside of the video disc. The relatively small mass of the mounting structure 12 including stylus 10 in comparison to that of support arm 15 assures movement of stylus 10 when element 16 is caused to bend rapidly. By applying a sawtooth shaped waveform to the bimorph element 16 once each revolution and particularly during the vertical blanking interval, the pickup stylus can be caused to continuously read-out the signal information in one complete convolution without disturbing the displayed image. A continuous read-out from one groove convolution allows a continuous play of the four frames of video information recorded in this groove. Hence, if the signal information during the four frames of this one convolution is substantially the same and without motion, then a signal read-out appearing as a still image will be produced on the television monitor. If, however, the signal information during the four frames of the repeated convolution is that of an image in motion, then the repetitious playback of the four frames will show a continuous repeat of the motion occurring during the four frame interval. This type of motion display is particularly useful when instructional information is recorded on the video disc such as, a tennis or a golf lesson, where it may be desirable to show a particular motion of, for example, a tennis or golf swing. An audio blanking system, not shown, may further be incorporated with the switches of switch panel 40 for blanking the audio signal output to the television receiver during such stop motion, fast-forward or reverse motion.

Depression of the fast-forward button 46 engages a divide by four portion of syn counter 38 providing thereby an output signal from this counter that corresponds to each four vertical sync pulses or each half revolution of the video disc record. Sawtooth generator 42 is further engaged by fast-forward button 46 to provide signals of opposite polarity from those utilized for either stop motion or reverse action (see FIG. 8d). Hence, upon depression of the fast-forward button 46, a sawtooth pulse is generated at each half revolution of the video disc record during the vertical blanking interval causing the bimorph element 16 to bend towards the center of the disc shifting stylus 10 to an adjacent groove convolution closer to the center of the disc record. The forward shifting motion of stylus 10 towards the center of the disc at each half revolution of the disc causes the pickup apparatus to sense spaced groups of two frames skipping four frames in between. This frame skipping motion, as mentioned above, effects a fast-forward motion of the displayed image.

In a smilar manner to that used for fast-forward, reverse action of the displayed image may be obtained. Depression of reverse button 48 causes the sync counter to operate in a divide by four mode as was done for the fast-forward motion. The sawtooth generator 42 is further caused to provide a sawtooth pulse having the same polarity as that provided for stop motion (see FIG. 8c). When reverse button 48 is engaged, a series of sawtooth waveforms are generated causing the bimorph element 16 to bend correspondingly towards the outside of the disc and successively reposition the stylus 10 into adjacent groove convolutions. Each sawtooth waveform is developed after one half revolution of the disc record. This results in playback of television frames where two frames are played followed by two frames immediately preceding the two frames just played, and so on. Video playback in such a sequence results in a reverse motion of the displayed image.

A further application of the subject groove skipper apparatus is in the removal of the signal pickup stylus from a locked groove. A locked groove, as described earlier, is one which causes the signal pickup stylus to repetitively play the same groove convolution. When a locked groove exists due to a flaw in the record, it may be desirable to reposition the stylus out of such locked groove and into the next adjacent groove convolution. Removal of the signal pickup stylus from a locked groove may be facilitated by momentarily engaging the fast-forward button 46 and therby causing the signal pickup stylus to be repositioned in a groove convolution closer to the center of the disc record. In the alternative, a system for sensing the presence of a locked groove may be incorporated with the subject groove skipper apparatus for automatically repositioning the signal pickup stylus out of a locked groove.

Where it is desirable to positively limit the amplitude of motion imparted by driving bimorph 16 to stylus 10, the embodiment of the invention illustrated in FIG. 1, may be modified to incorporate motion limiting means as shown in FIG. 3. A stopper bimorph 50 which is designed to be larger than the driving bimorph 16, is mounted on arm 15 in a manner which permits it to also be suspended between abutments 14. This stopper bimorph moves exactly the same lateral distance as the driving bimorph 16 during normal playback operation. However, when the driving bimorph 16 is actuated, its motion is effectively limited by the separations (see a and b in FIG. 4) between the stopper bimorph 50 and the abutments 14 secured to the mounting support 12.

FIGS. 5 and 6 demonstrate yet another embodiment of the invention. As shown therein, a driving bimorph 16 is attached to a main support arm 15. The stylus 10 is secured to a relativey pliable mounting support 12. A compliant support 52 secures the stylus support arm 15 to a carriage 54 so as to allow the stylus 10 to follow the lateral shift of the groove 22 during record playback.

When the stylus 10 is required to flip to another groove convolution, the driving bimorph 16 is deflected. Since this deflection takes place suddenly, the support arm 15 with its heavy mass does not move, but only the mounting support 12 with its light mass moves. The motion of the mounting support 12 due to the bimorph deflection is limited by abutments 55, which downwardly project from support arm 15, between which the mounting support 12 is located. Therefore, the distance the mounting support 12 moves is determined only by the gap between the abutments 55 and the mounting support 12. In FIG. 6, the gap "a" is approximately the distance of one groove separation, while the gap "b" is desirably made larger to overcome locked groove incidents. The gaps can be adjusted by dc biasing the bimorph.

Although the present invention has been described in the context of apparatus comprising a capacity sensing stylus, other types of signal pickup devices, such as those incorporating piezoelectric material, may also be utilized.

What is claimed is:

1. In a system for playing back prerecorded signals from a spiral track disposed on the surface of a disc record, apparatus comprising:
   (A) a signal pickup stylus;
   (B) a support arm;
   (C) a mounting structure secured to said support arm for positioning said stylus for engagement with said record track;
   (D) a driving element secured to said support arm;
   (E) means for sensing deviations of the relative positions of said mounting structure and said driving element from a predetermined relationship;
   (F) means responsive to the output of said sensing means for altering the position of said driving element in order to oppose said deviations; and
   (G) means for rendering said driving element additionally responsive to a command signal.

2. The system in accordance with claim 1 wherein said prerecorded signals disposed along said spiral track additionally include regularly recurring components; said apparatus further comprising:
   means for selectively providing a command signal once each disc record revolution; and
   means responsive to said regularly recurring components recovered by said stylus for timing the occurrences of said command signal.

3. The system in accordance with claim 1 further comprising:
   means for limiting lateral motion imparted by said driving element to said mounting structure; said limiting means also being responsive to the output of said sensing means.

4. In a video disc player including a pickup stylus subject to reception in a spiral groove of a video disc for recovering stored composite video signals inclusive of picture components and recurring deflection synchronizing components from successive regions along said disc groove when relative motion is established therebetween; said deflection synchronizing components occurring during recurring blanking intervals interleaved with intervals occupied by said picture components; the combination comprising:
   (A) a support structure including a support arm, a piezoelectric element secured to said support arm and a mounting structure secured to said support arm for positioning said stylus for reception in said disc groove; said piezoelectric element being selectively subject to bending toward or away from the center of said video disc upon electrical actuation thereof; said piezoelectric element effecting, when actuated, a lateral motion of said mounting structure of sufficient magnitude to move said stylus between adjacent convolutions of said spiral groove;
   (B) means for sensing deviations of the relative positions of said mounting structure and said motion effecting piezoelectric element from a predetermined relationship; and
   (C) means responsive to the output of said sensing means for bending said motion effecting piezoelectric element to compensate said sensed deviations.

5. The combination in accordance with claim 4 further comprising:
   means for limiting the lateral motion imparted by said piezoelectric element; said limiting means also being responsive to the output of said sensing means.

6. In a disc record player mechanism in which a signal pickup stylus is normally retained within a spiral, information-storing groove of a rotating disc record during playback thereof, apparatus for selectively changing the groove convolution in which said pickup stylus is retained comprising:
   (A) a support arm;
   (B) a mounting structure secured to said support arm for positioning said stylus in said record groove;
   (C) electrically actuated bending means secured to said support arm for imparting lateral motion to said mounting structure in response to control signals to a degree permitting shift of said stylus between adjoining convolutions of said groove;
   (D) control means electrically coupled to said bending means for selectively developing said control signals to control the lateral movement of said stylus;
   (E) means for sensing deviations of the relative positions of said mounting structure and said bending means from a predetermined relationship; and
   (F) means responsive to the output of said sensing means for changing the position of said bending means in a manner offsetting said deviations.

7. The system in accordance with claim 6 further comprising:
   means for limiting the lateral motion imparted by said bending means; said limiting means also being responsive to the output of said sensing means.

8. In a disc player for use with a disc record having a spiral, information-storing groove in a surface thereof; said player including a signal pickup stylus subject to reception in a disc record groove during rotation of the disc record, and normally subject upon said reception to retention within said groove by the walls of said groove during said rotation of the disc so that the information stored in successive convolutions of said spiral groove is recovered in sequence by said stylus; said stored information including time varying signal components and regularly recurring components; apparatus for selectively changing the groove convolution in which said pickup stylus is retained comprising:
   (A) a support arm mounted at one end in such manner that the other end of said support arm overlies the groove surface of the disc record during playback thereof;
   (B) a bimorph element having a first end and a second end and a pair of energizing terminals and comprised of piezoelectric material; said bimorph element normally having a straight configuration between said ends, but subject to bending therebetween when an energizing potential is applied across said energizing terminals; said first end of said bimorph element being secured to said other end of said support arm;
   (C) a mounting structure secured to said support arm for positioning said stylus for reception in said record groove; said mounting structure comprising a pair of laterally projecting, spaced apart, abutments, between which said second end of said bimorph element is interposed; and
   (D) control means for selectively applying said energizing potential across said bimorph element terminals; wherein the orientation of said bimorph element is such that said bending responsive motion of said second end imparts motion to said stylus in a direction transverse to the axis of said groove and of sufficient magnitude to override a groove wall;

said control means being additionally responsive to deviations in the relative position between said stylus and said support arm from a predetermined relationship.

9. The apparatus in accordance with claim 8 wherein: the mass of said stylus and said mounting structure is sufficiently smaller than the mass of said support arm to ensure movement of said stylus and said mounting structure when said bending of said bimorph element occurs.

10. The apparatus in accordance with claim 8 further comprising:

an additional bimorph element having a first end and a second end and a pair of energizing terminals and comprised of piezoelectric material; said additional bimorph element normally having a straight configuration between said ends, but subject to bending therebetween when an energizing potential is applied across said additional bimorph element energizing terminals; said first end of said additional bimorph element being secured to said other end of said support arm in a manner allowing its interposition between said spaced apart abutments;

means for rendering said additional bimorph element responsive to deviations in the relative position between said stylus and said support arm from a predetermined relationship.

11. The apparatus in accordance with claim 8 wherein said support arm is configured to comprise a pair of laterally projecting, spaced apart abutments between which said mounting structure is interposed.

* * * * *

UNITED STATES PATENT AND TRADEMARK OFFICE
CERTIFICATE OF CORRECTION

PATENT NO. : 4,164,756

DATED : August 14, 1979

INVENTOR(S) : Minoru Toda et al.

It is certified that error appears in the above-identified patent and that said Letters Patent are hereby corrected as shown below:

Column 1, line 55, "blow" should read -- flaw --.

Signed and Sealed this

Twenty-fifth Day of December 1979

[SEAL]

Attest:

Attesting Officer

SIDNEY A. DIAMOND

Commissioner of Patents and Trademarks